United States Patent Office

2,946,674
Patented July 26, 1960

2,946,674

PENTACHLOROCYCLOPENTADIENE-MONO-2-ETHYLHEXYL ETHER

Henry Rakoff, College Station, Tex., assignor to Velsicol Chemical Corporation, Chicago, Ill., a corporation of Illinois No Drawing. Filed Oct. 1, 1956, Ser. No. 612,918

3 Claims. (Cl. 71—2.3)

This invention relates to new halogenated compositions of matter. In particular, this invention relates to ethers of pentahalogenated cyclopentadiene possessing properties which provide superior protection against the detrimental effects of pests such as fungi, and also alleviates the harmful effects of undesired plant growth.

The new novel composition of the present invention has the following structure:

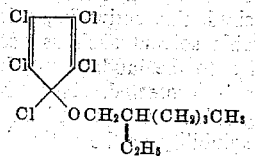

It is well known to the art that halogen atoms attached allylic to a double bond possess an enhanced activity. This shown by Krynitsky and Bost in 69 JACS (1947), 1918 where it also is stated that advantage of the difference between halogens so situated and halogens attached to a double bond, which to the contrary have a repressed activity, was taken in treating sodium ethoxide with hexachlorocyclopentadiene to produce the diethyl acetal of tetrachlorocyclo pentadiene-one. It is further known to the art that the addition of an oxygen-containing substituent to a carbon atom containing a halogen atom increases the activity of the chlorine substituent.

In the light of the aforementioned matter on the reactivity of the chlorine atom, one would readily predict that a substitution of both allylic chlorine atoms of hexachlorocyclopentadiene would result from its reaction with an alcoholate. This hypothesis is borne out by the aforementioned work of Krynitsky and Bost wherein they describe the preparation of tetrachlorocyclopentadiene-one-diethyl acetal by treating hexachlorocyclopentadiene with sodium ethoxide. On the contrary, if only one of the doubly allylic chlorine atoms of hexachlorocyclopentadiene were replaced by an oxygenated organic radical, a composition with increased utility and superior properties would be available for a multitude of applications.

Therefore, one object of the present invention is the preparation of pentachlorocyclopentadiene mono ethers.

Another object of the present invention is the preparation of new active compositions of matter capable of affording superior protection against fungus growth.

Still another object of the present invention is the preparation of new compositions of matter which in addition to providing superior protection against fungi also provide excellent control of undesirable plant growth.

Still another object of the present invention is a new method of protecting organic material from pests.

Still another object of the present invention is a new method for the protection of land and organic matter from undesired plant growth.

Other objects of the present invention will become apparent from the ensuing description of the present invention.

In view of the state of the art, the preparation of the mono ethers of pentachlorocyclopentadiene-one by a direct process would not appear to be possible due to the aforementioned relatively high activity of the second doubly allylic chlorine atom of hexachlorocyclopentadiene after the first doubly allylic chlorine atom has been replaced by an oxygenated organic radical.

EXAMPLE I

*Preparation of pentachlorocyclopentadiene mono-2-ethylhexyl ether*

One liter of 2-ethylhexanol was charged to a three-necked pyrex reaction flask equipped with stirrer, thermometer, addition funnel and heating mantle and heated to about 125° C. 46 grams (2.0 moles) of metallic sodium was slowly added to the 2-ethyl hexanol, this addition taking approximately 50 minutes. Then the reaction mixture temperature was lowered to about 56° C., at which time 273 grams (1.0 mol) of hexachlorocyclopentadiene was added by means of the addition funnel. The temperature was maintained at 56–59° for 2½ hours. At the end of the reaction period, the temperature was allowed to drop to about 30° C. The reaction mixture was diluted with water to dissolve the precipitated salt and the organic layer was separated by means of a separatory funnel, washed with water and dried. 583 grams of unreacted 2-ethylhexanol was recovered by distillation of the organic layer and the remainder of the organic layer was then fractionated to obtain the desired pentachlorocyclopentadiene-mono-2-ethylhexyl ether. 130 grams of the mono ether was recovered as the fraction boiling at 132–133.5° C./0.24–0.4 mm. Hg. This represented approximately 60% of the reaction products. The refractive index of the product at 20° C. is 1.5137.

| | C | H | Cl |
|---|---|---|---|
| | Percent | Percent | Percent |
| Analysis of Product | 42.84 | 4.41 | 48.16 |
| Calculated for $C_{13}H_{17}Cl_5O$ | 42.56 | 4.64 | 48.43 |

Since this method of preparation utilizes readily available compounds and requires no extraordinary reaction conditions, it is suitable for commercial operations. However, the scope of the preparation should not be construed as being limited to the precise temperature ranges, reactant ratios and the like, shown in the example. Rather, the etherification may be performed at temperatures from about 0 to about 200° C. although a preferred temperature range is about 50 to about 100° C. Likewise, while it is preferred to perform the reaction at atmospheric pressure, superatmospheric or partial vacuum may be utilized. While it is preferred to maintain a small excess of the salt prepared by the reaction of metallic sodium and 2-ethylhexanol (about 10%) an excess of hexachlorocyclopentadiene may be employed. Further, while the sodium salt of 2-ethyl hexanol was utilized in Example I, other salts such as potassium, may be employed. In the example metallic sodium and 2-ethyl hexanol were reacted in the reaction flask wherein subsequently the desired ether was prepared but the salt may, if desired, be prepared separately and then reacted with the required amount of hexachlorocyclopentadiene.

While the exact reason why both doubly allylic chlorine atoms of the hexachlorocyclopentadiene are not replaced in the aforeshown reaction is not positively known, it is believed to be partially due to the size and structure of the added organic radical. That is, it is believed that its physical characteristics shield the highly reactive doubly allylic chlorine atom and thus hinder the undesired but expected replacement of said atom. Consequently, I was unexpectedly able to prepare a highly desirable composition which heretofore was incapable of preparation.

Not only have I been able to produce this new pentahalogenated ether, but I have found that its unique structure imparts extremely valuable properties of superior value to farmers, horticulturists, and the like. They also are of value in the protection of leather, wood, etc. That is, after extensive investigation I have determined that this halogenated ether has superior value as a fungicide and also as a herbicide.

The beneficial fungicidal and herbicidal properties of the composition of the present invention are exemplified by the data listed in the following tables. This data is not to be interpreted as a limitation of the utility of this new compound.

TABLE 1.—FUNGICIDAL ACTIVITY

Toxicity of pentachlorocyclopentadiene 2-ethylhexyl monoether to *Sclerotinia fructicola* and *Stemphylium sarcinforme* was determined by the slide germination technique adopted by the Committee on Standardization of Fungicidal Tests of the American Phytopathological Society. Measured concentrations of spores were placed on glass slides in contact with different concentrations of the test compound. The percent germination of the spores is then determined for each treatment after 24 hours incubation at 72° F. Concentrations are in p.p.m. by weight.

| Compound | Percent Spore Germination | | | | | | |
|---|---|---|---|---|---|---|---|
| | *Sclerotinia fructicola* | | | | *Stemphylium sarcinforme* | | |
| | 1,000 p.p.m. | 100 p.p.m. | 10 p.p.m. | 1 p.p.m. | 1,000 p.p.m. | 100 p.p.m. | 10 p.p.m. |
| Check | 94 | | | | 98 | | |
| Composition of present invention | 0 | 5 | 3 | 7 | 6 | 13 | 77 |

TABLE 2.—HERBICIDAL ACTIVITY

The test compounds were applied at a concentration of 1000 p.p.m. by weight to 25 seeds each of radish and rye grass on a moistened filter paper in a Petri dish. Three cubic centimeters of solution, representing 0.0030 g. of test compound, were applied to each set of seeds. The Petri dishes and contents thereof were maintained at a constant temperature of 70° F.±1° and a constant relative humidity of 40%±2% for 7 days. Three replicates were used for each treatment. Percent germination was recorded at the end of the 7 day period.

| Compound | Percent Germination | Percent Post Germinative Mortality |
|---|---|---|
| Composition of Present Invention | 99.9 | 66.2 |
| 2-4 Dow Weed Killer | 92.0 | 0.0 |
| Untreated | 97.4 | 0.0 |

The percent post germinative mortality is the percentage of germinated seeds that died following germination. Thus, it is readily ascertainable from Table 2 that the new, unique ether of the present invention is capable of preventing plant growth.

This highly valuable, new compound may be utilized as a herbicide, fungicide, or a combination thereof. The latter possibility is of immeasurable value in many instances where both fungus and undesirable plant growth constitute a problem. Then, too, this new composition may be utilized in combination with other compounds. For example, it may be used in conjunction with an insecticide, fertilizer, etc.

The active ingredient of this invention may be applied in a variety of ways to materials which are to be protected such as by dusting, spraying, dipping, tumbling or any of the other means known to the art. When used as a fungicide to protect plants, it may be applied to the seeds as a seed protectant, to the soil or on the plants. While it may be used in its pure form, it is normally more beneficial to use formulations of this active ingredient. Again, the art of formulation is well known and virtually all of the methods known to the art for the formulation of solid materials are applicable to the new novel composition of the present invention.

Thus, this active compound may be adsorbed onto a carrier for more efficient application. Carriers are relatively inert materials which will carry the active ingredient. There are numerous solid carriers known to the art, most of which may be used. They include the diatomaceous earths, mica, talc, fuller's earth, bentonite and various flours. Standard blenders may be used to mix the active ingredient and carrier in various concentrations from 0.1 to 99%, depending on the application, although normally 2–50% active ingredient will be sufficient. Then, too, during the blending of the carrier and active ingredient, if a wettable powder is desired, dispersing and wetting agents may be added to said mixture in quantities dependent on factors such as the concentration of the active ingredient, identity of the carrier, et al. These wettable powders disperse readily in water and the plant, seeds, bulbs, etc. may be dipped therein or the dispersion may be used as a spray.

Further, if desired, this active ingredient may be dissolved in a suitable solvent such as acetone, kerosene, etc. and sprayed onto the land, plants, leather goods or other material to be protected. Here the concentration of the active ingredient will depend on such factors as the application, solubility of the active ingredient in the particular solvent and condition of the material being protected.

The following examples illustrate formulations of the compound of the present invention which are effective for use as fungicides and/or as herbicides. In all of the examples the active ingredient, pentachlorocyclopentadiene mono-2-ethylhexyl ether, will be referred to as "2-ethylhexyl ether."

EXAMPLE II

Percent by weight
"2-ethylhexyl ether" ---------------------------- 50
Celite 209 ----------------------------------- 50

Celite 209 is a diatomaceous earth utilized as a relatively inert carrier. The composition represented here is a 50% dust or granular, depending on how fine it is ground.

EXAMPLE III

Percent by weight
"2-ethylhexyl ether" ---------------------------- 75
Micro Cel 800 ------------------------------- 25

Micro Cel 800 is a synthetic, relatively inert, porous carrier material basically composed of calcium silicate. The composition of this example is a 75% dust or granular depending on the degree of grinding.

EXAMPLE IV

Percent by weight
"2-ethylhexyl ether" ---------------------------- 70
Micro Cel 800 ------------------------------- 27
Triton X–100 -------------------------------- 3

Triton X–100 is a wetting agent, chemically an alkyl aryl polyether alcohol. This composition is a 70% wettable powder suitable for use by making a slurry thereof.

EXAMPLE V

Percent by weight
"2-ethylhexyl ether" ---------------------------- 60
Isopropyl acetate ---------------------------- 23
Isopropyl alcohol ---------------------------- 10
Atlas 6–1690 --------------------------------- 7

Atlas 6–1690 is a commercially obtainable emulsifier while the acetate and alcohol serve as solvents. The formulation of this example is an emulsifiable concentrate.

The above examples illustrate formulations of the new, novel composition of the present invention. They are not meant to limit the present invention in any manner, but merely illustrate some of the many useful formulations in which this new ether may be utilized.

Other substances than the carrier, dispersion agent, wetting agent and emulsifier may be added in solid or liquid formulations of the active ingredient, if desired, such substances including spreaders, stickers and other auxiliary materials. Also, substances may be added to bring about various physical improvements such as prevention of lumping during storage, etc.

Various other modifications are possible and will occur to persons skilled in the art.

I claim as my invention:

1.

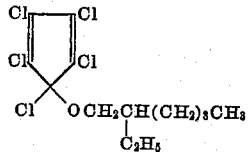

having a refractive index at 20° C. of approximately 1.5137 and a boiling point of 132–133.5° C. at 0.24–0.4 mm. Hg pressure.

2. A method for the protection of material against attack by fungus which comprises the application of an effective amount of the composition of claim 1 onto said material.

3. A method for the protection against undesired plant growth which comprises the application of a phytotoxic amount of the composition of claim 1 to said plants and their environment.

References Cited in the file of this patent

UNITED STATES PATENTS

| | | |
|---|---|---|
| 2,562,893 | Dawson et al. | Aug. 7, 1951 |
| 2,697,103 | Ordas | Dec. 14, 1954 |